United States Patent [19]

Mylich et al.

[11] 4,198,486

[45] Apr. 15, 1980

[54] FLAMEPROOF POLYSTYRENE FOAM AND PROCESS FOR THE MANUFACTURE THEREOF

[75] Inventors: Wolfgang Mylich, Sulzbach; Walter Albert, Frankfurt am Main, both of Fed. Rep. of Germany

[73] Assignee: Hoechst Aktiengesellschaft, Frankfurt am Main, Fed. Rep. of Germany

[21] Appl. No.: 20,838

[22] Filed: Mar. 15, 1979

[30] Foreign Application Priority Data

Mar. 18, 1978 [DE] Fed. Rep. of Germany ....... 2811951

[51] Int. Cl.$^2$ ................................................ C08J 9/14
[52] U.S. Cl. ................................. 521/79; 260/45.7 R; 521/85; 521/88; 521/92; 521/94; 521/123; 521/139; 521/146; 521/147; 521/148; 521/907

[58] Field of Search .................... 260/45.7 R; 521/79, 521/92, 907, 146, 147, 148

[56] References Cited

U.S. PATENT DOCUMENTS

| | | | |
|---|---|---|---|
| 3,639,298 | 2/1972 | Lister et al. | 521/907 |
| 3,699,041 | 10/1972 | Sauderford et al. | 521/92 |
| 3,865,760 | 2/1975 | Pitts et al. | 521/92 |
| 3,909,464 | 9/1975 | Auorga | 521/163 |

*Primary Examiner*—Morton Foelak
*Attorney, Agent, or Firm*—Curtis, Morris & Safford

[57] ABSTRACT

The flameproof styrene polymer foam in accordance with this invention is obtained by melting a granular mixture of styrene polymer and aluminum hydroxide having a grain size of 20–100 μm and a specific surface of below 1 m$^2$/g in an extruder, incorporating a physical expanding agent, and homogenizing and extruding the mixture.

11 Claims, No Drawings

FLAMEPROOF POLYSTYRENE FOAM AND PROCESS FOR THE MANUFACTURE THEREOF

The invention provides flameproof polystyrene foams which in the case of fire emit neither toxic and corrosive gases nor smoke.

Hitherto, flameproof polystyrene compositions are substantially prepared by adding organic halogen compounds, generally in combination with synergistic radical-forming agents or antimony trioxide. Although these mixtures are sufficiently flameproof, there is the disadvantage that in case of fire they emit toxic and corrosive gases as well as heavily sooting smoke.

It has therefore been proposed to flameproof organic polymers by adding water-containing fillers, such as aluminum hydroxide. Although this gives mixtures which in case of fire do not emit toxic or corrosive gases and generate smoke to an insignificant extent only, so that they are ecologically beneficial, these mixtures have not made their way in the industrial practice. In order to meet the modern requirements of flameproof behavior, for example in construction, it is necessary to add water-containing filler in such large amounts which prevents a satisfactory and trouble-free processing of the mixtures.

For example, in the case of polystyrene, sufficiently flameproof behavior is attained with addition of about 200%, relative to the polystyrene, of aluminium hydroxide. However, extrusion of mixtures containing such high amounts of filler yields articles having rough, cracky surfaces and poor mechanical properties.

It has now been found that excellent flameproof styrene polymer foams can be prepared when preformed granular mixtures of 100 parts by weight of polystyrene and 150 to 250 parts by weight of aluminum hydroxide having a grain size of from 20 to 100 $\mu$m and a specific surface of below 1.0m$^2$/g are melted in an extruder, gassed with 3 to 15% by weight, relative to the mixture, of a physical expanding agent having a boiling point in the range of from 273 to 323K, and extruded to give a foamed article.

There has been found a process for the manufacture of flameproof styrene polymer foams which comprises melting in an extruder a granular mixture consisting of 100 parts by weight of styrene polymer and 150 to 250, preferably 175 to 225, parts by weight of aluminum hydroxide having a grain size of from 20 to 100, preferably 40 to 80, $\mu$m and a specific surface of below 1.0m$^2$/g, preferably from 0.1 to 0.5m$^2$/g, and containing optionally from 0 to 30, preferably 0 to 10, parts by weight of known flameproofing agents, gassing the molten mixture with 3 to 15% by weight, relative to the mixture, of a physical expanding agent having a boiling point in the range of from 273 to 323 K, and, after thorough homogenization, extruding them to obtain foamed articles.

This process yields a foam having especially fine cells, which displays not only an excellent flameproof behavior, but also a smooth surface and good mechanical properties. It is surprising that despite the high filler amount density calues of below 100 g/l are obtained.

As stytrene polymer, there may be used homopolystyrene, copolymers of styrene such as styrene/acrylonitrile copolymers, styrene/methyl(meth)acrylate copolymers, acrylonitrile/ butadiene/styrene terpolymers, or polystyrene modified with rubber such as polybutadiene, styrene/butadiene rubber or ethylene/propylene/diene rubber.

Aluminium hydroxide is a cheap commercial product readily available from various manufactures with the grain sizes and specific surfaces as desired. The specific or BET surface is determined according to *Brunauer, Emmet* and *Teller, J. Amer. Chem. Soc.* 60 (1938), p. 309.

It is often advantageous to use mixtures of aluminum hydroxides having different grain sizes, for example mixtures of 70 to 30 parts by weight Al(OH)$_3$ having a grain size of from 20 to 30 $\mu$m and 30 to 70 parts by weight Al(OH)$_3$ having a grain size of from 70 to 80 $\mu$m. By using aluminum hydroxide coated with fatty acids or fatty acid salts, for example stearic acid, zinc stearate or calcium oleate, intermixing and homogenization can be further facilitated.

Suitable known flameproofing agents optionally to be used in addition are organic halogen or phosphorus compounds, ammonium sulfates or -phosphates, or preferably red phosphorus. When adding from 2 to 5 parts by weight of red phosphorus, the flameproofing effect is distinctly increased. In order to prevent formation of hydrogen phosphide due to the influence of moisture, the phosphorus is advantageously used in a previously phlegmatized form, for example coated with aluminum hydroxide or incorporated in a thermoplastic material, for example polystyrene. Suitable organic halogen compounds are for example chloroparaffin, decabromodiphenyl, decabromo-diphenyl ether, pentabromo-phenylallyl ether, 2,2-bis-[4-(2,3-dibromopropoxy) -3,5-dibromophenyl]-propane, pentabromo-monochloro-cyclohexane, hexabromo-cyclododecane or octabromohexadecane. Optionally, small amounts of antimony trioxide or synergistic radical-forming agents, for example peroxides, may be added. Suitable phosphorus compounds are for example tris-dibromopropyl phosphate, mono- or dinonylphenyl-tetraglycol ether phosphate.

The flameproof behavior can be further improved by adding carbonizing agents. As carbonizing agents, there are suitable chemical compounds or mixtures which at ignition temperature form a protecting carbon structure, for example by cross-linking, melting or softening while increasing their colume, or by another chemical reaction or physical alteration, such as urea/formaldehyde resins, melamine/formaldehyde resins, melamine phosphate, phthalic anhydride, pyromellitic anhydride, sodium borate, calcium borate, zinc borate or boric acid. The carbonizing agent is preferably added before granulation in amounts of from 3 to 15 parts by weight together with the other additives in a mixer running at high speed. Preferred is the use of melamine resin in hardened, pulverized form.

As physical expanding agents, there may be used hydrocarbons such as pentane, or preferably halogenated hydrocarbons such as monofluorotrichloromethane, monofluorodichloromethane, 1,2,2-trifluoro-1,1,2-trichloroethane or 1,1,2,2-tetrafluoro-1,2-dichloroethane. Of course, mixtures of these halogenated hydrocarbons with one another or other hydrocarbons the boiling point of which is below 273 K, such as difluoro-dichloromethane, may alternatively be used.

For preparing the starting granules the polystyrene, preferably together with the additives, is premixed in a mixer running at high speed, subsequently melted in a double-scrw extruder, extruded in the form of a strand, and comminuted in a hot melt granulator. The temperature of the melt should exceed 473 K either not at all or for a very short time only in order to prevent too early splitting-off of water. The granules are then melted again in an extruder provided with gas inlet, the screw of which has a length of preferably at least 20 D, a double-screw extruder provided with gas inlet or a tandem extruder, gassed with the physical expanding agent and, after thorough homogenization, ejected and foamed.

Depending on the desired properties of the foam and the intended use, normal additives such as stabilizers, for example phenolic antioxidants, lubricants, for example zinc or calcium stearate, waxes or white mineral oils, antistatic agents, for example sodium paraffin sulfonates, pigments or dyestuffs may be added, too.

The process of the invention is suitable especially for the manufacture of profiles or plates such as they are used above all in construction for insulating purposes.

The following Examples illustrate the invention.

EXAMPLE 1

In a powder mixer provided with agitator rotating at high speed, 20 kg of a polystyrene having a reduced specific viscosity (RVS) of 1.18dl/g, measure on a 1% solution in toluene at 293 K in an Ubbelohde viscosimeter, and a melt flow index (according to German Industrial Standard DIN 53 735) MFI 200/5 of 4g/10 min. were mixed for 2 minutes with 0.04 kg of n-octadecyl-$\beta$-(4'-hydroxy-3',5'-di-tert.-butylphenyl)-propionate and 0.4 kg of zinc stearate, and, after having added 40 kg of Al(OH)$_3$, (grain size 60 $\mu$m, BET surface 0.1m$^2$/g), the batch was again mixed for 2 minutes. The mixture was then melted on a double-screw extruder (Werner & Pfleiderer ZSK 53), the screw of which ran at a speed of 120 rpm. The temperature of the extruder was adjusted in such a manner that it was gradually raised from 453 K at the inlet to 468 K at the nozzle. The temperature of the mass was 468 to 478 K. An irregularly shaped, rough and cracky strand of melt was extruded through a slotted nozzle directly into a hot melt granulator and comminuted therein.

The granules so manufactured were melted in a tandem extruder provided with a plasticizing extruder provided with gas inlet (diameter 60 mm) and a cooling and mixing extruder (diameter 90 mm), and mixed with 8% by weight, relative to the mixture, of monofluorotrichlorourethane (boiling point 296.92 K). In the extruder provided with gas inlet, the temperature was adjusted in such a manner that it was gradually raised from 488 K at the inlet to 473 K at the junction with the second extruder. In the second extruder, the batch was first cooled and then heated to 423 K at the nozzle having a hole of a diameter of 8 mm. The strand leaving the nozzle expanded immediately to give a smooth, homogeneous and uniform foam strand having a diameter of 31 mm and a density of 90g/l. The structure of the foam strand was very fine and uniform.

A strand having a length of 40 cm was subjected from below at an angle of 45° to the nonluminous flame of a Bunsen burner. In the range of the flame, the strand burned weakly with insignificant development of smoke only and without formation of toxic or corrosive gases. Little pieces dripping off extinguished rapidly. 30 cm of the strand remained above the flame without continuing to burn. The lower end became pointed by heat deformation and consisted practically of slightly sooty Al$_2$O$_3$.

EXAMPLES 2 to 10

Example 1 was repeated with varying amounts of Al(OH)$_3$ having different grain sizes and surfaces. In order to determine the behavior on contact with a flame, test specimens cut from the strands, having dimensions of 10×3×3 cm were clamped in horizontal direction, and their front edge was subjected for 3 seconds to the nonluminous Bunsen burner flame. The average time of afterburning was determined on 5 test specimens. Composition of the strands and results of the burning tests are listed in Table I.

EXAMPLES 11 to 21

Examples 4 to 6 were repeated with varying contents of additional diverse known flameproofing agents, Composition and behavior on contact with a flame are listed in Table II.

Table I

| | Polystyrene | Al(OH)$_3$ | | | average |
|---|---|---|---|---|---|
| Ex. | parts by weight | grain size $\mu$m | spec. surface m$^2$/g | parts by weight | after burning time sec. |
| 2* | 100 | 60 | 0.1 | 100 | continues burning |
| 3* | 100 | 60 | 0.1 | 125 | continues burning |
| 4 | 100 | 60 | 0.1 | 150 | continues burning |
| 5 | 100 | 60 | 0.1 | 175 | 12 |
| 6 | 100 | 60 | 0.1 | 200 | 5 |
| 7 | 100 | 60 | 0.1 | 225 | 2 |
| 8 | 100 | 25 | 0.5 | 140 | 4 |
|   |     | 70 | 0.05 | 60 |   |
| 9 | 100 | 25 | 0.5 | 100 | 5 |
|   |     | 70 | 0.05 | 100 |   |
| 10 | 100 | 25 | 0.5 | 60 | 6 |
|   |     | 70 | 0.05 | 140 |   |

*not claimed

Table II

| Example | Polystyrene parts by weight | Al(OH)$_3$ | | | Flammproofing agent | parts by weight | average afterburning time sec. |
|---|---|---|---|---|---|---|---|
| | | grain size $\mu$m | spec. surface m$^2$/g | parts by weight | | | |
| 11 | 100 | 60 | 0.1 | 150 | Decabromodiphenyl ether | 15 | 7 |
| 12 | 100 | 60 | 0.1 | 175 | Decabromodiphenyl ether | 10 | 4 |
| 13 | 100 | 60 | 0.1 | 200 | Decabromodiphenyl ether | 5 | 2 |
| 14 | 100 | 60 | 0.1 | 200 | red phosphorus | 2 | 2 |
| 15 | 100 | 60 | 0.1 | 200 | red | 5 | 1 |

Table II-continued

| Example | Polystyrene parts by weight | Al(OH)₃ grain size μm | Al(OH)₃ spec. surface m²/g | Al(OH)₃ parts by weight | Flamm-proofing agent | parts by weight | average after-burning time sec. |
| --- | --- | --- | --- | --- | --- | --- | --- |
| 16 | 100 | 60 | 0.1 | 200 | phosphorus melamine resin | 10 | 4 |
| 17 | 100 | 60 | 0.1 | 200 | melamine resin | 15 | 4 |
| 18 | 100 | 60 | 0.1 | 200 | red phosphorus malamine resin | 2 10 | 0 |
| 19 | 100 | 60 | 0.1 | 200 | ammonium polyphosphate | 20 | 5 |
| 20 | 100 | 60 | 0.1 | 200 | ammonium sulfate | 20 | 4 |
| 21 | 100 | 60 | 0.1 | 200 | ammonium sulfate | 40 | 2 |

What is claimed is:

1. A process for the manufacture of flameproof styrene polymer foams which comprises melting in an extruder a granular mixture consisting of 100 parts by weight of styrene polymer and 150 to 250 parts by weight of aluminum hydroxide having a grain size of from 20 to 100 μm and a specific surface of below 1.0m²/g, and containing from 0 to 30 parts by weight of known flameproofing agents, gassing the molten mixture with 3 to 15% by weight, relative to the mixture, of a physical expanding agent having a boiling point in the range of from 273 to 323 K, and, after thorough homogenization extruding them to obtain foamed articles.

2. The process as claimed in claim 1, wherein a granular mixture consisting of 100 parts by weight of styrene polymer and 175 to 225 parts by weight of aluminum hydroxide is used.

3. The process as claimed in claims 1 and 2, wherein the aluminum hydroxide has a grain size of from 40 to 80 μm.

4. The process as claimed in claims 1 to 3, wherein the aluminum hydroxide has a specific surface of from 0.1 to 0.5m²/g.

5. The process as claimed in claims 1 to 4, wherein the aluminum hydroxide is coated with stearic acid.

6. The process as claimed in claims 1 to 5, wherein the granular mixture contains organic halogen compounds as known flameproofing agents.

7. The process as claimed in claimes 1 to 5, wherein the granular mixture contains red phosphorus as known flameproofing agent.

8. The process as claimed in claims 1 to 5, wherein the granular mixture contains ammonium sulfate as known flameproofing agent.

9. The process as claimed in claims 1 to 8, which comprises using monofluoro-trichloromethane as physical expanding agent.

10. The process as claimed in claims 1 to 9, wherein the granular mixture contains in addition from 5 to 15 parts by weight of a carbonizing agent.

11. The process as claimed in claim 10, which comprises using as carbonizing agent a hardened and pulverized melamine resin.

* * * * *